(12) United States Patent
Kong et al.

(10) Patent No.: US 8,228,314 B2
(45) Date of Patent: Jul. 24, 2012

(54) TOUCH-SENSITIVE SCREEN AND A TOUCH-SENSITIVE DEVICE USING THE SAME

(75) Inventors: Jing Kong, Shenzhen (CN); Guiyun Liu, Shenzhen (CN); Yun Yang, Shenzhen (CN); Wei Feng, Shenzhen (CN)

(73) Assignee: BYD Company, Ltd., Shenzhen (CN)

( * ) Notice: Subject to any disclaimer, the term of this patent is extended or adjusted under 35 U.S.C. 154(b) by 476 days.

(21) Appl. No.: 12/428,449

(22) Filed: Apr. 22, 2009
(Under 37 CFR 1.47)

(65) Prior Publication Data
US 2009/0278811 A1 Nov. 12, 2009

(30) Foreign Application Priority Data
May 6, 2008 (CN) .......................... 2008 1 0096144

(51) Int. Cl.
*G06F 3/045* (2006.01)

(52) U.S. Cl. ...................................... 345/174; 345/173

(58) Field of Classification Search .................. None
See application file for complete search history.

(56) References Cited

U.S. PATENT DOCUMENTS

| | | | | |
|---|---|---|---|---|
| 5,220,136 A | * | 6/1993 | Kent | 345/173 |
| 5,451,724 A | * | 9/1995 | Nakazawa et al. | 178/18.05 |
| 6,424,094 B1 | * | 7/2002 | Feldman | 315/169.3 |
| 2004/0239647 A1 | * | 12/2004 | Endo | 345/173 |
| 2009/0167711 A1 | * | 7/2009 | Jiang et al. | 345/173 |
| 2010/0214233 A1 | * | 8/2010 | Lee | 345/173 |

FOREIGN PATENT DOCUMENTS
KR 100746269 B1 * 8/2007

* cited by examiner

*Primary Examiner* — Lixi C Simpson
(74) *Attorney, Agent, or Firm* — Morgan, Lewis & Bockius LLP

(57) ABSTRACT

A touch-sensitive screen and a resistance touch-sensitive device using the same, wherein said screen comprises: an insulating substrate, a rectangular conducting layer formed on said insulating substrate, a conducting layer electrode array formed on the four edges of said conducting layer, a conductive coat formed on said conducting layer, and a conductive coat electrode wherein, at least 3 pairs of the conducting layer electrodes are deployed in said conducting layer electrode array; each pair of the conducting layer electrodes are deployed on the parallel edges of the conducting layer symmetrically; and the conducting layer electrode is set on each edge of the conducting layer. As the conducting layer electrodes are deployed symmetrically on the parallel edges of the conducting layer, the electric filed lines tends to be evenly distributed when the voltage is loaded onto the edges of the conducting layer; thus the linearity of the equipotential lines is enhanced.

14 Claims, 7 Drawing Sheets

—PRIOR ART—

—PRIOR ART—

TOUCH-SENSITIVE SCREEN AND A TOUCH-SENSITIVE DEVICE USING THE SAME

CROSS-REFERENCE TO RELATED APPLICATIONS

This application claims the benefit of priority under 35 U.S.C. §119(a) to Chinese Application No. 200810096144, filed on May 6, 2008, the invention of which is incorporated by reference herein in its entirety.

BACKGROUND OF THE INVENTION

1. Field of the Invention

The present invention relates to a touch-sensitive screen and a touch-sensitive device using the same.

2. Background of the Related Art

Nowadays, the touch-sensitive devices can be divided into four basic categories: resistance touch-sensitive device, capacitance touch-sensitive device, infrared ray touch-sensitive device and surface acoustic wave touch-sensitive device; wherein, the resistance touch-sensitive device is with lowest cost and is mostly widely used.

The resistance touch-sensitive devices can be categorized to: four wires, five wires and other types of touch-sensitive devices based on the number of the derived wires. A resistance touch-sensitive device comprises a screen and a touch-sensitive device controller. FIGS. 1, 2A and 2B show the basic structure of a five wires resistance touch-sensitive screen. As shown in FIG. 1, said five wires resistance touch-sensitive screen comprises an insulating substrate 2, a rectangular conducting layer 3 formed on the said insulating substrate 2, and a conductive coat 5 formed on said conducting layer 3 wherein, said conductive coat is separated from said conducting layer by a spacer layer 4. As shown in FIG. 2A, the five wires resistance touch-sensitive screen further comprises four conducting layer electrodes 6 located in the four corners of the conducting layer 3.

Further, as shown in FIG. 2B, a conductive coat electrode 6' is derived from the conductive coat 5 to be used as a probe to measure voltage. Since there are five wires to be derived for the five electrodes in this type of touch-sensitive device, it is also called five wires resistance touch-sensitive device; wherein, said conducting layer 3 is a precise resistance net, and four conducting layer electrodes 6 are derived from four corners of the conducting layer 3. While a voltage is loaded on the X direction and Y direction of the conducting layer 3 respectively via the conducting layer electrode 6, different parts of the conducting layer 3 have different electric potentials corresponding to their locations. As shown in FIG. 3, while a touch action is generated, said conductive coat 5 is electrically connected to the conducting layer 3. At this time, said touch-sensitive controller loads a voltage to the X direction and the Y direction of the conducting layer 3 respectively via the conducting layer electrode 6. Said touch-sensitive controller further obtains the electric potentials in X and Y directions of the touching point via the conductive coat electrodes 6' on the conductive coat 5, and exports the obtained potentials via the conductive coat electrodes 6' on the conductive coat 5 to calculate the coordinates of the touching point.

However, the conventional five wires resistance touch-sensitive device has a typical technical bottle neck, the pillow distortion caused by the edge effects. The conventional five wires resistance touch-sensitive device has four conducting layer electrodes 6 located in the four corners of the conducting layer 3 to load the voltage, and the distance between the conducting layer electrodes is large. As a result, the electric filed lines are not evenly distributed; the equipotential lines are thus bent and eventually cause pillow distortion. A distribution of the pillow distortion equipotential lines is denoted in real lines in FIG. 4. The pillow distortion will make it difficult to estimate the touching point location at the edge of the touch-sensitive screen and will be a disadvantage to miniaturize the five wires resistance touch-sensitive device. There have been solutions in the prior art to correct the linearity of the equipotential lines to some extent, such as precise resistance net wiring, programmable system to regulate the resistance net wiring, sixth order compensation algorithm etc. However, the above mentioned correction methods are complicated, operation capacity consuming and high cost.

SUMMARY OF THE INVENTION

In one aspect of the invention, a touch-sensitive screen comprises: an insulating substrate, a rectangular conducting layer formed on the said insulating substrate, a conducting layer electrode array formed on the four edges of the said conducting layer such that there is at least one conducting layer electrode on each of the four edges of said conducting layer, a conductive coat formed on said conducting layer, wherein said conductive coat is separated from said conducting layer by a spacer layer, and the conductive coat electrode located on the said conductive coat; wherein, said conducting layer electrode array includes at least three pairs of conducting layer electrodes, each pair of the conducting layer electrodes are deployed symmetrically on the parallel edges of the conducting layer.

In another aspect of the invention, a resistance touch-sensitive device comprises a screen and a touch-sensitive controller wherein, said screen is provided in the present invention. The pin of the touch-sensitive controller is electrically connected to one of the conducting layer electrode wherein, said touch-sensitive device controller is configured to load voltage periodically onto each pair of the conducting layer electrodes on two respective parallel edges of the conducting layer, when a conductive coat is connected to the conducting layer in response to a touching action. The controller is further configured to obtain a voltage at the conductive coat electrode when the conducting layer electrode is subject to the periodical voltage and output the obtained voltage.

Comparing to the four conducting layer electrodes in the conventional five wires touch-sensitive device, the touch-sensitive screen in the present invention has at least two more pairs of conducting layer electrodes deployed symmetrically on two respective parallel edges of the conducting layer, and the electric filed lines tend to be evenly distributed when an electric voltage is loaded onto the edges of the conducting layer. Thus the linearity of the equipotential lines is enhanced and the pillow distortion in the conventional five wires resistance touch sensitive device is eliminated. Accordingly, the location of the touching point can be reflected more accurately by the electric potentials of the touching point.

When a touch action is generated on the screen of the touch-sensitive device, the conductive coat gets connected to the conducting layer. The touch-sensitive controller in the present invention is configured to load a voltage to the conducting layer electrodes deployed in the X axis edges and the Y axis edges of the conducting layer, and measure the electric potentials of the conductive coat electrodes on the conductive coat when the conducting layer electrode is subject to the loaded voltage. Since the linearity of the equipotential lines is enhanced, the measured electric potentials can reflect the actual location on the conducting layer more accurately. Accordingly, the measured electric potentials is analyzed to obtain the actual coordinates of the touching point in both X and Y directions.

DETAILED DESCRIPTION OF THE PREFERRED EMBODIMENTS

Hereinafter, the embodiments of the invention will be described in detail with reference to the accompanying drawings.

Figure 1:
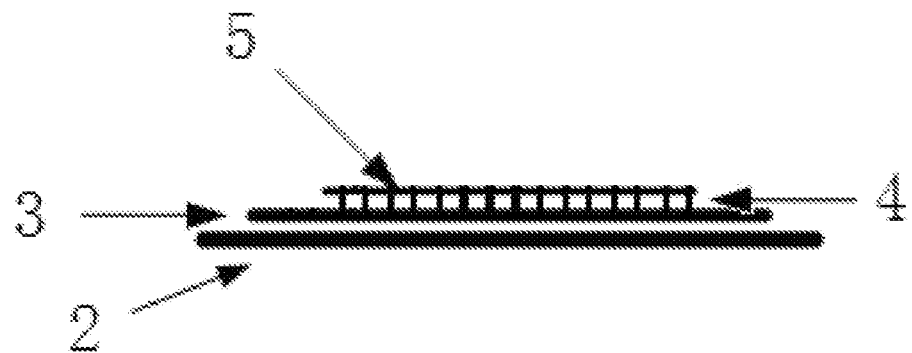
FIG. 1 shows an approximate sketch structure of a resistance touch sensitive screen.
Figure 2:
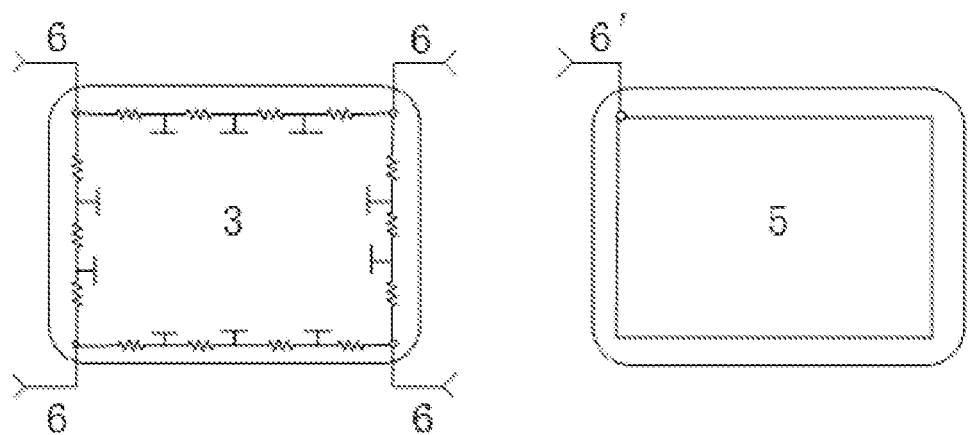
FIG. 2A shows a sketch view of the conducting layer of a five wires touch-sensitive screen.
FIG. 2B shows a sketch view of the conductive coat of a five wires touch-sensitive screen.
Figure 2A:
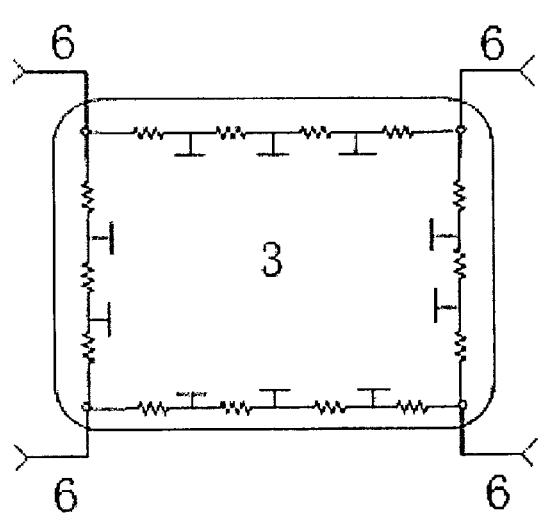
Figure 2B:
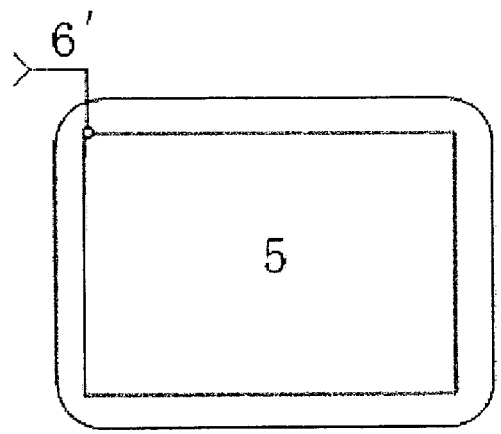
Figure 3:
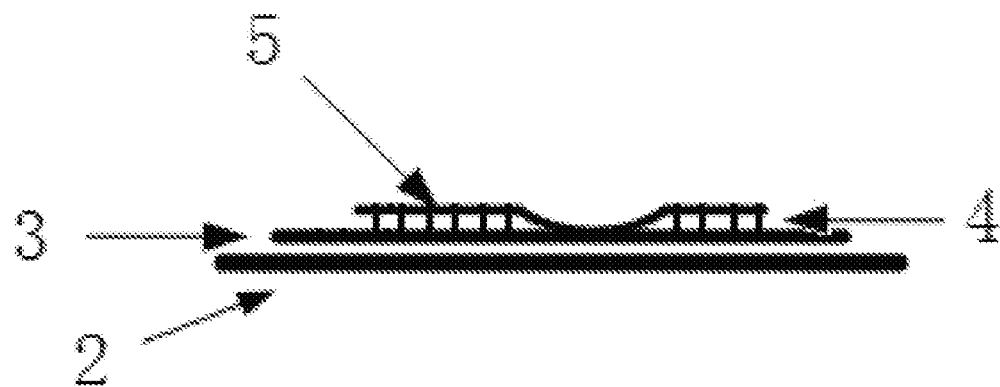
FIG. 3 shows a sketch view of a touch-sensitive screen when being touched.
Figure 4:
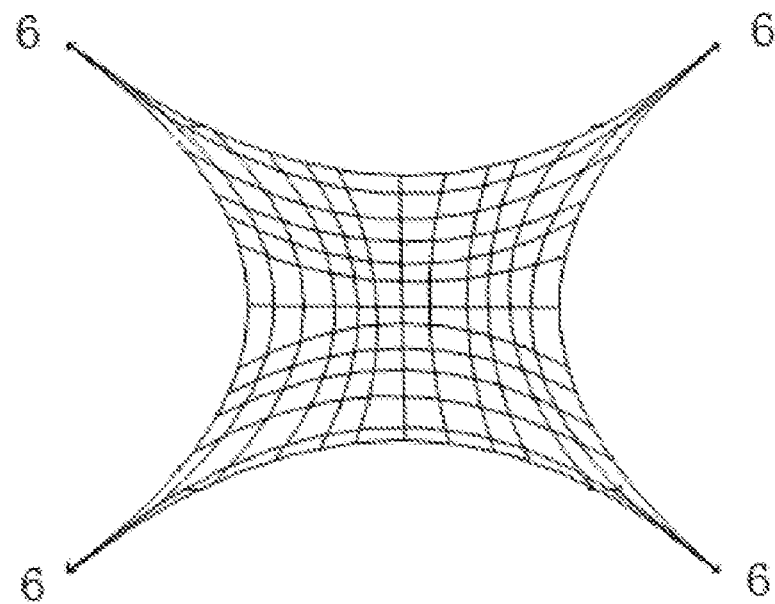
FIG. 4 shows a sketch view of a distribution of the pillow distortion equipotential lines occurred in a five wires touch-sensitive screen.
Figure 5:
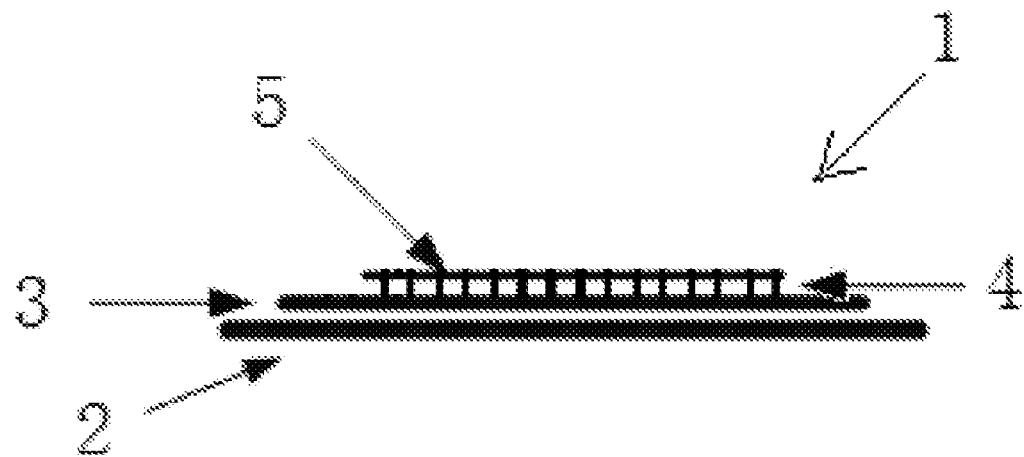
FIG. 5 shows an approximate sketch structure of a resistance touch sensitive screen in the present invention.
Figure 6:
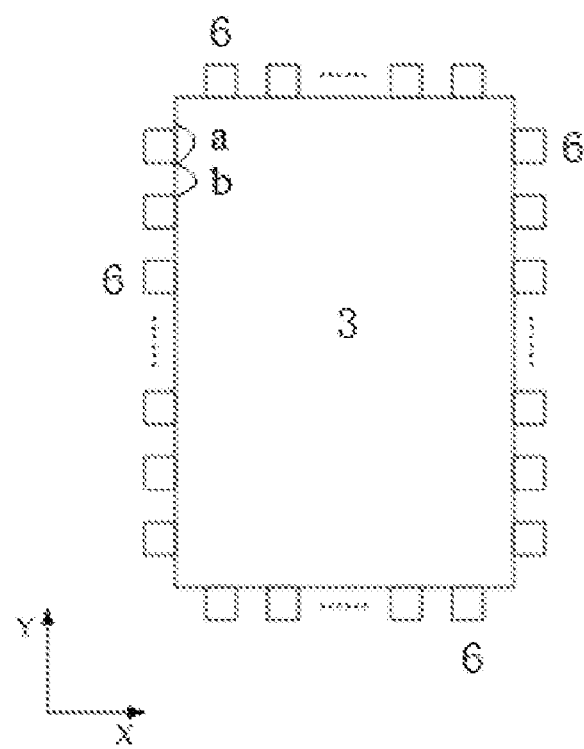
FIG. 6 shows a sketch view of a distribution of the conducting layer electrodes on the conducting layer of a resistance touch screen in the present invention.

As shown in FIGS. 2B, 5 and 6, a touch-sensitive screen 1 is provided. Said screen 1 comprises: an insulating substrate 2, a rectangular conducting layer 3 formed on said insulating substrate 2, a conducting layer electrode array formed on the four edges of said conducting layer 3 such that there is at least one conducting layer electrode 6 on each of the four edges of said conducting layer 3, a conductive coat 5 formed on said conducting layer 3, wherein said conductive coat 5 is separated from said conducting layer 3 by a spacer layer 4; wherein, said conducting layer electrode array includes at least three pairs of conducting layer electrodes 6, each pair of the conducting layer electrodes 6 are deployed symmetrically on two respective parallel edges of the conducting layer 3.

When there are three pairs of conducting layer electrodes 6 in the conducting layer electrode array, said three pairs of electrodes can be deployed as below: two pairs of the conducting layer electrodes 6 are deployed at the four corners of the conducting layer 3, while the other pair of the electrodes 6 is deployed symmetrically on either pair of the parallel edges; or two pairs of the electrodes 6 are deployed on one pair of the parallel edges, while the other pair of electrodes 6 are deployed symmetrically on the other pair of the parallel edges.

In general, said insulating substrate 2 is made of glass with a thickness of 1.0 to 3.0 mm. Said conducting layer 3 can be made of Indium oxidation or Tin oxidation coated equally on said glass substrate. Normally, said conductive coat 5 is made of Nicole-gold coating material which has good conductibility. Said conductive coat electrode 6' can be derived from any location of said conductive coat 5 as long as it conducts the potential of the conductive coat 5.

In some embodiments, at least three pairs of conducting layer electrodes 6 are deployed on a pair of two parallel edges of the four edges of the conducting layer 3, wherein said at least three pairs of electrodes 6 are distributed evenly on said parallel edges. While the electrodes 6 are not evenly distributed, because the conducting layer electrode 6 is an equipotential object, it will affect the even distribution of the equipotential lines in the area close to the conducting layer electrode 6, where the two edges of the conducting layer are not loaded with voltage. Accordingly, an even distribution of the conducting layer electrodes 6 can enhance the linearity of the equipotential lines. Thus, the potential of a certain point can indicate the location of said certain point on the conducting layer more accurately.

When the conducting layer electrodes 6 are distributed evenly, as shown in FIG. 6, a ratio between the length of the conducting layer 3's edge "a" covered by a single conducting layer electrode 6 and the length of the uncovered space area "b" between the two adjacent conducting layer electrodes 6 (denoted as occupation-space ratio hereafter) is set to range from 4:1 to 1:4, in some embodiments, set to be 1:1, wherein "b" is a fixed value. When the occupation-space ratio is too large, i.e., the conducting layer electrode 6 has a relatively large dimension, although the linearity of equipotential lines of the area close to the conducting layer electrode 6 where the two edges of the conducting layer are loaded with voltage is enhanced, the linearity of equipotential lines of the area close to the conducting layer electrode 6 where the two edges of the conducting layer are not loaded with voltage is the opposite effect. Since the conducting layer electrode 6 is an equipotential object, when the conducting layer electrode 6 is too large, it will have a bad effect on the linearity of the equipotential lines of the area close to the conducting layer electrode 6 where the two edges of the conducting layer are not loaded with voltage. On the other hand, when the occupation-space ratio is too small, i.e., the conducting layer electrode 6 has a relatively small dimension, although the linearity of the equipotential lines of the area close to the conducting layer electrode 6 where the two edges of the conducting layer are not loaded with voltage is good, it goes against the linearity of the equipotential lines of the area close to the conducting layer electrode 6 where the two edges of the conducting layer are loaded with voltage. Therefore, the occupation-space ratio is set to range from 3:1 to 1:3, in some embodiments set to be 1:1.

Figure 7:
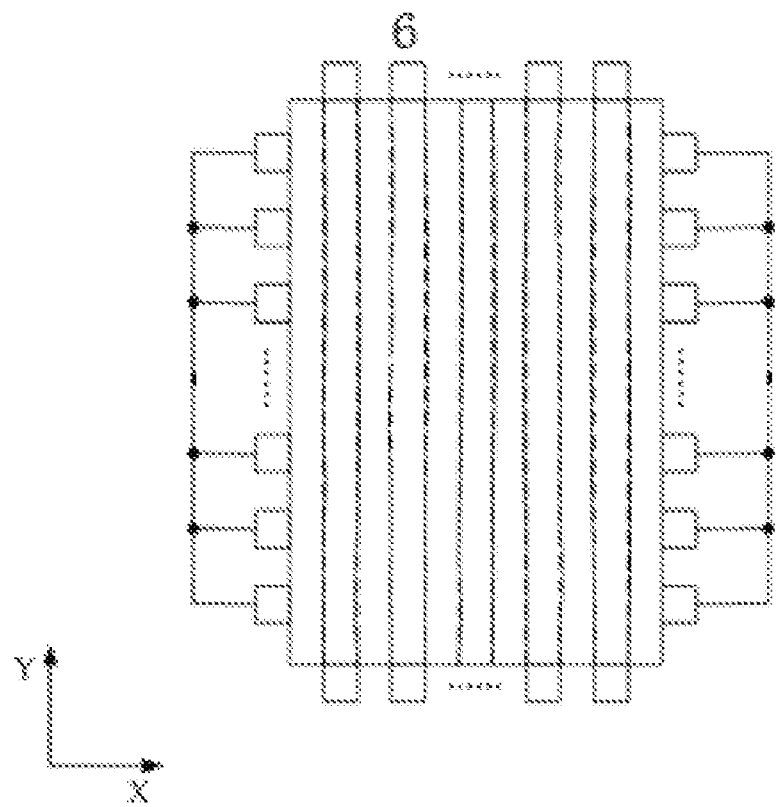
FIG. 7 shows a sketch view of a distribution of the electric potentials on the conducting layer when a voltage is loaded on the X axis of two respective parallel edges of the conducting layer.
Figure 8:
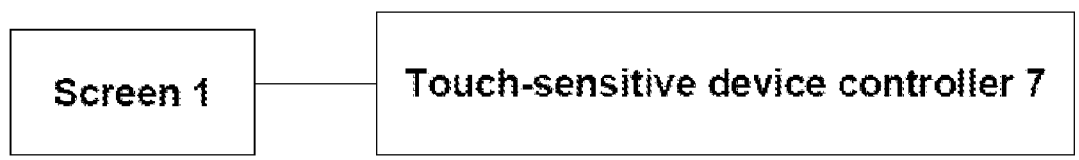
FIG. 8 shows a structure of a resistance touch-sensitive screen in the present invention.

Theoretically, when a voltage is loaded onto the conducting layer 3, the larger the number of the conducting layer electrodes 6 distributed on the edges of the conducting layer 3, the better the linearity of the equipotential lines. However, increasing the number of the conducting layer electrodes 6 will increase the cost of the entire touch-sensitive control circuit and make the entire control process more complicated. To control the cost as well as to keep the complexity of the control process in an allowable range, in some embodiments, the number of pairs of the conducting layer electrodes 6 on the two parallel edges of the four edges of the conducting layer 3 is no more than 30 pairs. As shown in FIG. 7, the number of the conducting layer electrodes 6 on the two Y axis edges of the conducting layer 3 is 16 pairs and the occupation-space ratio is 1:1. When a voltage is loaded on the two X axis edges of the conducting layer, the distribution of the equipotential lines on the conducting layer 3 is denoted in dotted line in FIG. 7. The real lines in FIG. 7 are the ideal linear equipotential lines. According to the figure, the distribution of the equipotential lines can nearly meet the requirements of the linearity. Indeed, the number of the conducting layer electrodes 6 distributed on the edges of the conducting layer 3 can be determined by the specific dimension of the touch-sensitive screen and is not limited to the range of 1 to 30 pairs.

The touch-sensitive screen 1 has at least two more conducting layer electrodes 6 deployed symmetrically on the edges of the conducting layer 3. Thus the electric filed lines tend to be distributed evenly when an electric voltage is loaded onto the edges of the conducting layer 3. As a result, the linearity of the equipotential lines is enhanced and the potential of the touching point can reflect the location of the touching point more accurately.

Furthermore, as shown in FIGS. 2B, 5, 6 and 8, a resistance touch-sensitive device is provided in the present invention wherein, said device comprises a screen and a touch-sensitive controller 7 wherein, said screen 1 is provided in the present invention, and the pins of the touch-sensitive controller 7 are connected electrically to the conducting layer electrode 6 when the conductive coat 5 gets connected to the conducting layer 3 in response to a touch action. Said touch-sensitive controller 7 is configured to load voltage onto each pair of the conducting layer electrodes 6 on the two pairs of parallel edges of the conducting layer 3. The voltage is loaded periodically onto each pair of the conducting layer electrodes 6 on the two pairs of parallel edges of the conducting layer 3. The controller is configured to obtain the voltage at the conductive coat electrode 6' when the conducting layer electrode 6 is subject to the periodical voltage, and output said obtained voltage.

Figure 9:
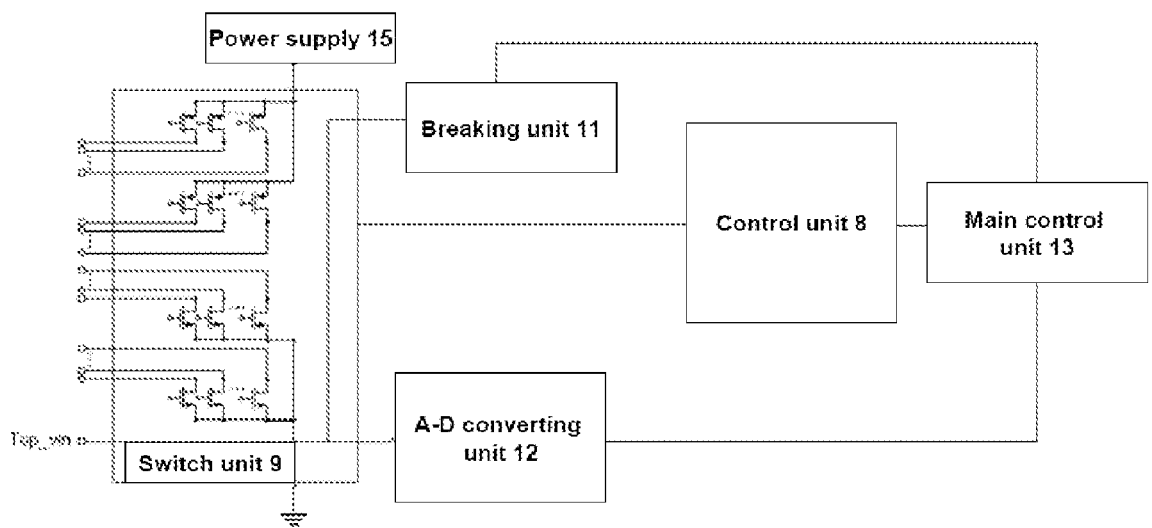
FIG. 9 shows a structure of a resistance touch-sensitive controller in the present invention.
Figure 10:
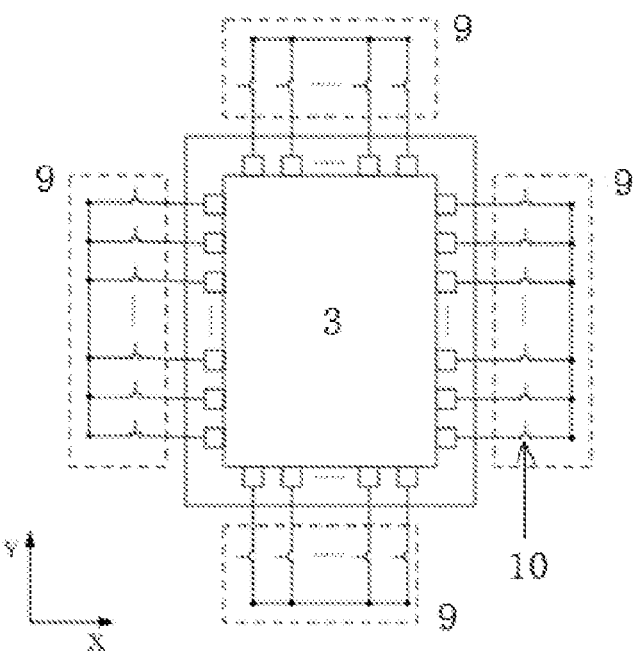
FIG. 10 shows a sketch view of the connection between a resistance touch-sensitive screen and a controller.

As shown in FIGS. 9 and 10, said touch-sensitive controller 7 comprises a main control unit 13, a control unit 8 electrically connected to said main control unit 13, a breaking unit 11, an A-D converting unit 12, a switch unit 9 electrically connected to the control unit 8 wherein, said breaking unit 11 is configured to generate a breaking signal when the conductive coat 5 is connected to the conducting layer 3 and output said signal to the main control unit 13; said main control unit is configured to send a control instruction to said control unit 8 to operate the touch-sensitive controller 7 after receiving the breaking signal; said switch unit 9 further comprises multiple controllable switches 10, wherein the wire connection terminal of each of the controllable switches 10 is electrically connected to a respective conducting layer electrode 6, and the control terminal of each of the controllable switches 10 is connected to the control unit 8;

Said control unit 8 is configured to control the breaking and connection of the multiple controllable switches 10 according to the control instruction received from said main control unit 13, so as to load voltage periodically onto the two pairs of parallel edges of the conducting layer 3;

Said A-D converting unit 12 is configured to convert the analog voltage at the conductive coat electrode 6' to digital voltage when the voltage is loaded periodically onto the two parallel pairs of edges, and output said digital voltage to the main control unit 13.

In general, said touch-sensitive controller 7 further comprises a power supply 15, wherein said power supply 15 is connected to the other wire connection terminal of said controllable switch 10 and supplies voltage for the conducting layer electrode 6.

Wherein, said control unit 8, switch unit 9, A-D converting unit 12 and main control unit 13 are all known to those skilled in the art. For example, the controllable switch in the switch unit 9 can be a MOS switch; and said A-D converting unit 12 can be an A-D converter. Wherein, the pins of the touch-sensitive device controller are corresponding to the conducting layer electrode 6 and the conductive coat electrode 6' in said screen 1.

As shown in FIGS. 9 and 10, the connection between said screen 1 and said touch-sensitive screen controller 7 is described as below: each of the conducting layer electrode 6 in said screen 1 is connected to a respective wire connection terminal of each of the controllable switches 10 in the switch unit 9; the control terminal of each of the controllable switches 10 is connected to the control unit 8; and a conductive coat electrode 6' derived from the conductive coat 5 of said screen 1 is connected to the breaking unit 11 and the A-D converting unit 12 respectively. Therefore, the control unit 8 controls the breaking and connection of the controllable switches 10 in the switch unit 9, and further controls the periodical loading of voltage on the X and Y axis directions of the conducting layer 3. For example, when the X axis coordinate of the touching point needs to be measured, the control unit 8 will connect the controllable switch 10 connected to the conducting layer electrode 6 on the two Y axis edges, and break the controllable switch 10 connected to the conducting layer electrode 6 on the two X axis edges. Accordingly, an excitation voltage is loaded onto the two Y axis edges of the conducting layer 3. The same method can further be used to load an excitation voltage onto the two X axis edges of the conducting layer 3. Each of the controllable switches 10 in the switch unit 9 is corresponding to a respective conducting layer electrode 6.

Figure 11:
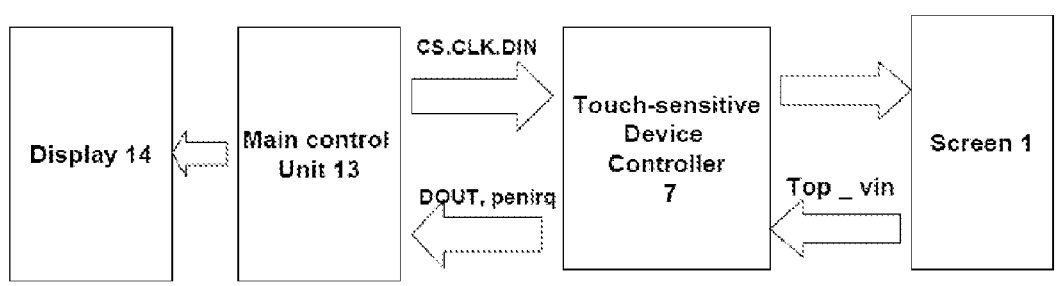
FIG. 11 shows a sketch view of working process of a resistance touch-sensitive screen in the present invention.

The process of operating the resistance touch-sensitive device in the present invention is illustrated in FIG. 11 and described in detail herein below.

As shown in FIG. 11, the touch-sensitive screen 1, the touch-sensitive device controller 7, the main control unit 13 and the display screen 14 are connected in serial. When a touch action is generated on said screen 1, the conductive coat 5 in said screen 1 gets connected to the conducting layer 3; the potential of a certain pin of the touch-sensitive controller 7 is therefore decreased. At this time, the touch-sensitive controller 7 generates a breaking signal (penirq) via the breaking unit 11 and sends said breaking signal to the main control unit 13 for further processing. The main control unit 13 further sends a control instruction (CS, CLK, DIN) to the touch-sensitive controller 7 to operate the controller 7 after detecting said breaking signal.

The controller 7 loads voltage periodically onto the two X axis edges of the conducting layer 3 and the other two Y axis edges of the conducting layer 3 through controlling the connection and breaking of the controllable switches 10 in the switch unit 9. The controller 7 further converts the potential (Top_vin) of the conductive coat electrode 6' to a binary code (Dout) via the A-D converting unit 12 within two voltage loadings, and transmits said binary code to the main control unit 13. Therefore, the main control unit 13 calculates the X-Y coordinates of the touching point according to said binary code, and displays said touching point on said display 14.

The resistance touch-sensitive device eliminates the pillow distortion by increasing the number of the conducting layer electrodes 6 symmetrically and evenly along each edge of the conducting layer 3. Apparently, the linearity of the equipotential is therefore enhanced when a voltage is loaded on the conducting layer 3. Accordingly, the potentials of the different areas on the conducting layer 3 can reflect the coordinates of the current locations more accurately. As a result, the potential of the touching point can determine the location coordinates of the touching point more accurately. Furthermore, there is no need to correct the linearity of the potentials for the touch-sensitive device in the present invention. Instead, the number of the conducting layer electrodes 6 is increased herein, and the switch unit 9 in the touch-sensitive controller 7 is modified accordingly. Accordingly, the present invention simplifies the manufacturing process, saves the cost and enables the five wires resistance touch-sensitive device to achieve miniaturization based on its intrinsic advantages.

The foregoing description of the embodiments of the present invention has been provided for the purpose of illustration and description. It is not intended to be exhaustive or limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A screen for a touch-sensitive device comprising:
   an insulating substrate;
   a rectangular conducting layer formed on said insulating substrate, wherein the conducting layer includes two respective pairs of parallel edges;
   a conducting layer electrode array formed on the two respective pairs of parallel edges of said conducting layer such that there is at least one conducting layer electrode on each of the four edges of said conducting layer;
   a conductive coat formed on said conducting layer, wherein said conductive coat is separated from said conducting layer by a spacer layer;
   a conductive coat electrode located on said conductive coat;
   wherein, said conducting layer electrode array includes at least three pairs of conducting layer electrodes, each conducting layer electrode being a respective wire connection terminal, and each pair of the conducting layer electrodes are deployed symmetrically on a respective pair of two parallel edges of the conducting layer, such that each of at least one of the three pairs of the conducting layer electrodes is deployed substantially close to the center of a respective one of two parallel edges of the conducting layer.

2. The screen of claim 1 wherein, two of the three pairs of the conducting layer electrodes are deployed at four corners of the conducting layer.

3. The screen of claim 1 wherein, the number of pairs of the conducting layer electrodes deployed on the two parallel edges of the four edges of the conducting layer is no more than 30 pairs.

4. The screen of claim 1 wherein, said insulating substrate is made of glass.

5. The screen of claim 1 wherein, the thickness of said insulating substrate is 1.0 to 3.0 mm.

6. The screen of claim 1 wherein, the conducting layer is made of Indium oxidation or Tin oxidation that is equally coated on the insulating substrate.

7. The screen of claim 1 wherein, the conductive coat is made of Nickel-gold coating material.

8. The screen of claim 1 wherein, the ratio between the length of the conducting layer edge covered by a single conducting layer electrode and the length of the uncovered space between the two adjacent conducting layer electrodes is between 4:1 and 1:4.

9. The screen of claim 1 wherein, the ratio between the length of the conducting layer edge covered by a single conducting layer electrode and the length of the uncovered space between the two adjacent conducting layer electrodes is between 3:1 and 1:3.

10. A resistance touch-sensitive device comprising a screen and a touch-sensitive controller wherein,
    said screen further comprises:
      an insulating substrate;
      a rectangular conducting layer formed on said insulating substrate, wherein the conducting layer includes two respective pairs of parallel edges;
      a conducting layer electrode array formed on the two respective pairs of parallel edges of said conducting layer such that there is at least one conducting layer electrode on each of the four edges of said conducting layer;
      a conductive coat formed on said conducting layer, wherein said conductive coat is separated from said conducting layer by a spacer layer;
      a conductive coat electrode located on said conductive coat;
      wherein, said conducting layer electrode array includes at least three pairs of conducting layer electrodes, each conducting layer electrode being a respective wire connection terminal, and each pair of the conducting layer electrodes are deployed symmetrically on a respective pair of two parallel edges of the conducting layer, such that each of at least one of the three pairs of the conducting layer electrodes is deployed substantially close to the center of a respective one of two parallel edges of the conducting layer;
    said touch-sensitive controller is configured to load an input voltage periodically onto each pair of the three pairs of conducting layer electrodes on the two pairs of parallel edges of the conducting layer such that, when the conductive coat is brought into contact with the conducting layer in response to a touching action, the touch-sensitive controller is further configured to obtain an output voltage at the conductive coat electrode for the corresponding pair of conducting layer electrodes.

11. The touch-sensitive device of claim 10 wherein, said touch sensitive controller comprises a main control unit, a control unit electrically connected to said main control unit, a breaking unit, an A-D converting unit and a switch unit electrically connected to the control unit wherein,
    said breaking unit is configured to generate a breaking signal while the conductive coat is in contact with the conducting layer, and output said signal to the main control unit; said main control unit is configured to send a control instruction to said control unit to operate the touch-sensitive controller after receiving the breaking signal;
    said switch unit further comprises multiple controllable switches, each controllable switch including a wire connection terminal that is electrically connected to a respective conducting layer electrode of said conducting layer electrode array and a control terminal that is electrically connected to the control unit;
    said control unit is configured to control the breaking and connecting of the multiple controllable switches according to the control instruction received from said main control unit, so as to load the input voltage periodically onto a respective pair of conducting layer electrodes on one of the two pairs of parallel edges of the conducting layer;

said A-D converting unit is configured to convert the output voltage at the conductive coat electrode to a digital signal when the input voltage is loaded periodically onto a respective pair of conducting layer electrodes on one of the two parallel pairs of edges, and output said digital signal to the main control unit.

12. The touch-sensitive device of claim 11 wherein, said controllable switch in the switch unit is a MOS switch.

13. The touch-sensitive device of claim 11 wherein, said A-D converting unit is an A-D converter.

14. The touch-sensitive device of claim 11 wherein, the touch-sensitive controller further comprising a power supply wherein, said power supply is connected to the other wire connection terminal of said controllable switch and supplies voltage for the conducting layer electrode.

* * * * *